Patented June 19, 1951

2,557,284

UNITED STATES PATENT OFFICE 2,557,284

ESTERS OF PANTOTHENIC ACID, INTERMEDIATES THEREOF, AND PROCESS FOR THEIR PRODUCTION

Stanton A. Harris, Westfield, and Karl Folkers, Plainfield, N. J., assignors to Merck & Co., Inc., Rahway, N. J., a corporation of New Jersey No Drawing. Application July 14, 1945, Serial No. 605,193, which is a division of application Serial No. 386,942, April 4, 1941. Divided and this application March 3, 1948, Serial No. 12,895

12 Claims. (Cl. 260—463)

This invention relates to esters of pantothenic acid, intermediates thereof, and processes for their production. This application is a division of our co-pending application Serial No. 605,193, filed July 14, 1945, now abandoned, which, in turn, is a division of application Serial No. 386,-942, filed April 4, 1941.

Pantothenic acid occurs widely in nature and has recently become available by synthetic methods. According to the most widely used methods of preparation, laevorotatory α-hydroxy-β,β-dimethyl butyrolactone is reacted with β-alanine or some derivative of β-alanine, such as its sodium salt or its ester.

However, pantothenic acid is soluble mainly in polar solvents, such as water and the lower alcohols. For certain types of use it is desired to use pantothenic acid in an oil medium, and for this purpose the ordinary pantothenic acid of commerce is not suited.

We have discovered that esters of pantothenic acid of the following structure $$R_1O-CH_2C(CH_3)_2CH(OR_2)CONHCH_2CH_2COOR_3$$

where $R_1$ is an acyl group or hydrogen, $R_2$ is an acyl group, and $R_3$ is hydrogen or an alkyl group are soluble in oil. Esters of this type may be formed by reacting an ester of α-gamma-dihydroxy-β,β-dimethyl butyric acid chloride with an ester of β-alanine. The butyric acid chloride can be made by reacting α-hydroxy-β,β-dimethyl-gamma-butyrolactone with liquid ammonia to give α-gamma-dihydroxy-β,β-dimethyl mutyramide, which is then reacted with the desired acid anhydride or acid chloride to give the ester of the amide. The latter product is reacted with amyl nitrite to give the ester α-gamma-dihydroxy-β,β-dimethyl butyric acid, from which the desired acid chloride may be obtained.

For certain uses an ester of the following structure is desired $$R_4O-CH_2C(CH_3)_2CHOHCONHCH_2CH_2COOR_3$$

where $R_4$ may be the radical of an organic acid or an inorganic acid, for example, one of the phosphoric acids.

We have discovered that such derivatives may be prepared by reacting the carbobenzyloxy ester of α-hydroxy-β,β-dimethyl butyrolactone with β-alanine or one of its derivatives to form a monocarbobenzyloxy ester of pantothenic ester. The latter may then be treated with the desired esterifying agent, and the resulting diester of pantothenic acid hydrogenated to remove the carbobenzyloxy radical. This process may be illustrated as follows:

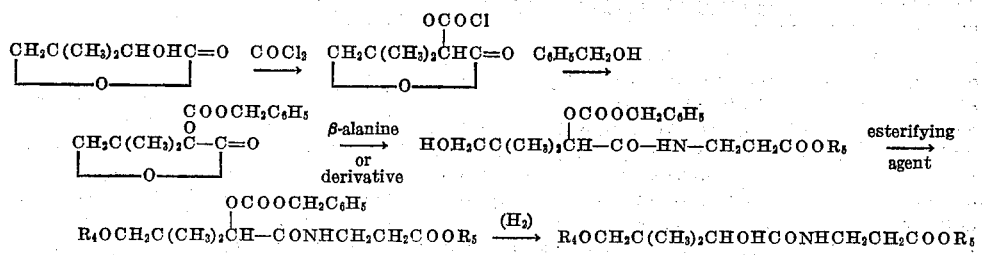

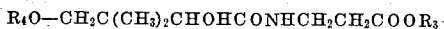

The above diagram also shows how the monocarbobenzyloxy ester of the lactone is prepared.

We have also discovered that mono esters of pantothenic acid or derivatives having the ester residue in the α-position of the butyric acid residue may be prepared by treating the lactone with an esterifying agent such as an acid chloride or acid halide to form an α-substituted-β,β-dimethyl-γ-butyrolactone where the substituent in the α-position has the formula RCOO—, R being a radical of the class which consists of alkyl, nitrophenyl and aralkoxy radicals and reacting this lactone containing a single ester group with a lower alkyl ester of β-alanine or an alkali metal salt of β-alanine followed by acidification, thus producing a monoacylated pantothenic acid compound having the formula:

$$CH_2OHC(CH_3)_2CH(OOCR)CONHCH_2CH_2COOR'$$

where R is a radical selected from the class which consists of alkyl, nitrophenyl and aralkoxy radicals, and R' is a radical selected from the class which consists of hydrogen and lower alkyl radicals.

The following examples illustrate methods of carrying out the present invention, but it is to be understood that these examples are given by way of illustration and not of limitation.

*Example 1*

0.62 gram of α-p-nitrobenzoxy-β,β-dimethyl-gamma-butyrolactone are heated with 0.233 gram of sodium β-alaninate for one hour on a steam bath. After a few minutes, the mixture becomes gummy, and solidifies to a brittle mass on cooling. The material is dissolved in 10 cc. of water, with deposition of crystals of starting material. The filtrate is acidified with hydrochloric acid, and a gummy precipitate separates. It is readily soluble in alcohol, and is reprecipitated as an oil upon the addition of water. On standing overnight, the mono nitrobenzoate of pantothenic acid crystallizes, and is recrystallized from acetone upon the addition of water, M. P. 137–138°; $(a)_D^{29°} = +4.5°$ (in 95% alcohol, C=0.78%).

*Example 2*

A benzene solution containing 6 grams of α-hydroxy-β,β-dimethyl-gamma-butyrolactone and 8.65 grams of antipyrine are added to a benzene solution containing 4.6 grams phosgene. Crystalline antipyrine hydrochloride separates. After 15 minutes, 5 grams benzyl alcohol and 8.65 grams antipyrine dissolved together in benzene are added to the above solution whereupon heat is evolved, and additional antipyrine hydrochloride separates out. The mixture is heated on a steam bath for 15 minutes, then filtered, the filtrate washed three times with water and then dried over calcium chloride. After concentration under reduced pressure, the syrup commences to crystallize. It is recrystallized by dissolving in water, and adding a little alcohol until turbidity is produced. On cooling α-carbobenzylidioxy-β,β-dimethyl-gamma-butyrolactone separates, M. P. 78°; yield 5.05 grams (41.8%), $(a)_D^{29°}=+12.3°$ (in 95% alcohol C=2.1%).

1.9 grams of freshly distilled β-alanine ethyl ester are mixed with 4.2 grams of α-carbobenzyldioxy-β,β-dimethyl-butyrolactone, and heated on a steam bath for 1½ hours. It is then shaken with water and extracted with ether. After washing with dilute hydrochloric acid and water, the ether extract is dried over calcium chloride, and filtered with charcoal. The oily residue is distilled between 140–150° bath temperature at $4 \times 10^{-6}$ mm. pressure to form the monocarbobenzyloxy ester of ethyl pantothenate (ethyl α-carbobenzyldioxy-β,β-dimethyl-gamma-hydroxy-butyryl-β-alanide).

*Example 3*

26 grams of acetyl lactone are mixed with 17.7 grams of β-alanine ethyl ester, and heated on the steam bath for two hours. It is then distilled from a wide armed distilling flask at $10^{-2}$ mm. A forerun up to 155° totaling 12 grams is obtained. The main crop is distilled at 155–160°. The yield of monoacetyl ethyl panothenate (ethyl α-acetoxy-β,β-dimethyl-gamma-hydroxy-butyryl-β-alanide) is 28 grams (64.5%).

We wish it to be understood that we do not desire to be limited to the exact details described, for obvious modifications will occur to a person skilled in the art.

We claim:

1. Monoacylated pantothenic acid compounds having the formula:

CH₂OHC(CH₃)₂CH(OOCR)CONHCH₂CH₂COOR' wherein R is a radical selected from the class which consists of acetyl, nitrophenyl and benzyloxy, and R' is a radical selected from the class which consists of hydrogen and lower alkyl radicals.

2. Ethyl α-carbobenzyldioxy-β,β-dimethyl-γ-hydroxy-butyryl-β-alanide.

3. Ethyl α-acetoxy-β,β-dimethyl-γ-hydroxy-butyryl-β-alanide.

4. α-p-Nitrobenzoxy-β,β-dimethyl-γ-hydroxy-butyryl-β-alanide.

5. α-Carbobenzyldioxy-β,β-dimethyl-γ-butyrolactone.

6. The process of preparing monoacylated pantothenic acid compounds which comprises heating together a mixture having as its sole components a compound selected from the class which consists of lower alkyl esters of β-alanine and alkali metal salts of β-alanine and an α-substituted β,β-dimethyl-gamma-butyrolactone wherein the substituent in the α-position has the formula: RCOO— wherein R is a radical selected from the class which consists of methyl, nitrophenyl and benzyloxy radicals, to produce a monoacylated pantothenic acid compound having the formula:

HOCH₂C(CH₃)₂CH(OOCR)CONHCH₂CH₂COOR' wherein R has the significance above-defined, and R' is a radical selected from the class which consists of hydrogen and lower alkyl radicals, and recovering said monoacylated pantothenic acid compound from the reaction mixture.

7. The process of preparing α-p-nitrobenzoxy-β,β-dimethyl-gamma-hydroxy-butyryl-β-alanide which comprises heating a mixture having as its sole components α-p-nitrobenzoxy-β,β-dimethyl-gamma-butyrolactone and sodium β-alaninate thereby producing a gummy reaction mixture containing the sodium salt of α-p-nitrobenzoxy-β,β-dimethyl-gamma-hydroxy-butyryl-β-alanide, dissolving said reaction mixture in water and making the resulting solution acid with hydrochloric acid thereby producing a gummy precipitate of crude α-nitrobenzoxy-β,β-dimethyl-gamma-hydroxy-butyryl-β-alanide, and recrystallizing said precipitate from aqueous alcohol and then from aqueous acetone to produce substantially pure α-p-nitrobenzoxy-β,β-dimethyl-gamma-hydroxy-butyryl-β-alanide.

8. The process of preparing ethyl α-acetoxy-β,β-dimethyl-gamma-hydroxy-butyryl-β-alanide which comprises heating, for approximately two hours, a mixture having as its sole components α-acetoxy-β,β-dimethyl-gamma-butyrolactone and the ethyl ester of β-alanine thereby forming a reaction mixture containing ethyl α-acetoxy-β,β-dimethyl-gamma-hydroxy-butyryl-β-alanide, and then subjecting said reaction mixture to vacuum distillation to produce substantially pure ethyl α-acetoxy-β,β-dimethyl-gamma-hydroxy-butyryl-β-alanide.

9. The process which comprises mixing together, in benzene solution, α-hydroxy-β,β-dimethyl-gamma-butyrolactone, antipyrine and phosgene, whereupon crystalline antipyrine hydrochloride precipitates, allowing the reaction mixture to stand for approximately 15 minutes, adding to the resulting mixture a solution containing benzyl alcohol and antipyrine dissolved in benzene, whereupon heat is evolved and additional antipyrine hydrochloride separates, heating the resulting mixture on a steam bath for approximately 15 minutes, filtering the reaction mixture thereby removing antipyrine hydrochloride, evaporating the benzene filtrate to produce α-carbobenzyldioxy-β,β-dimethyl-gamma-butyrolactone, heating said α-carbobenzyldioxy-β,β-dimethyl-gamma-butyrolactone with a lower alkyl ester of β-alanine to produce the corresponding alkyl α-carbobenzyldioxy-β,β-dimethyl-gamma-hydroxy-butyryl-β-alanide, mixing this compound with a compound selected from the class which consists of lower aliphatic carboxylic acid halides and lower aliphatic carboxylic acid anhydrides to form the corresponding alkyl α-carbobenzyldioxy-β,β - dimethyl - gamma-acyloxy-butyryl-β-alanide, reacting this compound with hydrogen and recovering the resulting alkyl α-hydroxy-β,β-dimethyl - gamma-acyloxy-butyryl-α-alanide from the reaction mixture 10. The process which comprises mixing together, in benzene solution, α - hydroxy - β,β-dimethyl-gamma-butyrolactone, antipyrine and phosgene, heating the resulting mixture, in benzene solution, with benzyl alcohol and additional antipyrine, filtering the reaction mixture thereby removing by-product antipyrine hydrochloride, evaporating the benzene filtrate to produce α-carbobenzyldioxy-β,β-dimethyl - gamma - butyrolactone, heating said α - carbobenzyldioxy - β,β - dimethyl-gamma-butyrolactone with the ethyl ester of β-alanine to produce a reaction mixture containing ethyl α-carbobenzyldioxy-β,β-dimethyl-gamma-hydroxybutyryl-β-alanide, and subjecting said reaction mixture to vacuum distillation thereby recovering said ethyl α - carbobenzyldioxy-β,β-dimethyl-gamma - hydroxy-butyryl-β-alanide.

11. The process which comprises mixing together, in benzene solution, α-hydroxy-β,β-dimethyl - gamma - butyrolactone, antipyrine and phosgene, heating the resulting mixture, in benzene solution, with benzyl alcohol and additional antipyrine, filtering the reaction mixture thereby removing by-product antipyrine hydrochloride, and evaporating the benzene filtrate to produce α-carbobenzyldioxy-β,β-dimethyl - gamma-butyrolactone.

12. The process which comprises heating for approximately one and one-half hours, a mixture having as its sole components α-carbobenzyldioxy-β,β-dimethyl - gamma - butyrolactone and the ethyl ester of β-alanine to produce a reaction mixture containing ethyl α-carbobenzyldioxy-β,β-dimethyl-gamma-hydroxybutyryl-β-alanide, and subjecting said reaction mixture to vacuum distillation thereby recovering said ethyl α-carbobenzyldioxy-β,β-dimethyl - gamma - hydroxy-butyryl-β-alanide.

STANTON A. HARRIS.
KARL FOLKERS.

REFERENCES CITED

The following references are of record in the file of this patent:

Mitchell, Jour. Am. Chem. Soc., vol. 62, pp. 1776–1779 (1940).
Stiller, Jour. Am. Chem. Soc., vol. 62, pp. 1779–1784 (1940).
Harris et al., Jour. Am. Chem. Soc., vol. 63, pp. 2662–2667 (1941).

Certificate of Correction

Patent No. 2,557,284                                   June 19, 1951

STANTON A. HARRIS ET AL.

It is hereby certified that error appears in the printed specification of the above numbered patent requiring correction as follows:

Column 1, line 44, for "mutyramide" read *butyramide*; line 47, after the word "ester" insert *of*; column 2, line 5, for "ester", second occurrence, read *acid*; column 3, line 29, for "carbobenzylidioxy" read *carbobenzyldioxy*; line 53, for "panothenate" read *pantothenate*; column 5, line 5, for "α-alanide" read *β-alanide*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*